United States Patent [19]
Marshall et al.

[11] Patent Number: 5,685,398
[45] Date of Patent: Nov. 11, 1997

[54] FAST RESPONSE ADJUSTABLE BRAKE

[75] Inventors: Jeffrey F. Marshall, Milwaukee; David J. Warnke, West Bend; Gene W. Poker, Oconomowoc; William A. Baker, St. Francis, all of Wis.

[73] Assignee: Rexnord Corporation, Milwaukee, Wis.

[21] Appl. No.: 672,248

[22] Filed: Jun. 28, 1996

[51] Int. Cl.$^6$ ............................................ B60T 13/04
[52] U.S. Cl. .................. 188/171; 188/72.3; 188/216; 188/196 R; 188/71.7; 164/108
[58] Field of Search ................... 188/171, 72.3, 188/71.7–71.9, 216, 72.9, 158–165, 196 R, 18 A; 192/90, 84.5, 84.51; 164/108

[56] References Cited

U.S. PATENT DOCUMENTS

| | | |
|---|---|---|
| 2,512,565 | 6/1950 | Hallander . |
| 2,964,137 | 12/1960 | Luedtke et al. . |
| 3,171,515 | 3/1965 | Wolfe . |
| 3,357,528 | 12/1967 | Verlinde . |
| 3,525,424 | 8/1970 | McCarthy . |
| 3,608,679 | 9/1971 | Harrison . |
| 3,763,968 | 10/1973 | Noly . |
| 4,004,262 | 1/1977 | Grove . |
| 4,022,301 | 5/1977 | Hansen . |
| 4,142,610 | 3/1979 | Alexander et al. . |
| 4,156,478 | 5/1979 | Kroeger . |
| 4,476,965 | 10/1984 | Brown, Jr. et al. . |

(List continued on next page.)

FOREIGN PATENT DOCUMENTS 556985  10/1943  United Kingdom .

OTHER PUBLICATIONS

Kebco Spring–Set Brakes, Combistop, Kebco, Inc., 14700 Martin Dr., Eden Prairie, MN 55344.

Lenze Power Transmission –Spring applied brakes with electromagnetic release, 14.92.32 US, Lenze Power Transmission, 175 Route 46 West, Fairfield, NJ 07004.

Binder –The Power of Magnetism, Binder Magnete GmbH, Monchweilerstrasse 1, D–78048 Villingen–Schwenningen.

*Primary Examiner*—Douglas C. Butler
*Attorney, Agent, or Firm*—Andrus, Sceales, Starke & Sawall

[57] ABSTRACT

A brake (30) includes a magnetically permeable body (38) having a pole face (40), an armature (42) axially movable toward and away from the pole face, an energization coil (44) energizable to magnetically attract the armature toward the pole face, biasing members (50) biasing the armature away from the pole face, a pressure plate (64) mounted to the body and axially spaced from the pole face, a friction disc (66) between the armature and the pressure plate and keyable to an axially extending rotary shaft (36), such that upon deenergization of the coil, the biasing members bias the armature to a braking position pushing the friction disc against the pressure plate to stop rotation of the disc and shaft, the armature in the braking position defining an air gap (80) between the pole face and the armature, and such that upon energization of the coil, the armature is pulled through the gap toward the pole face to a released position releasing the disc and permitting rotation of the shaft. The body includes a housing shell (82) having a plurality of magnetically permeable segments (84, 86, 88) breaking up eddy currents and enabling faster brake response. An air gap adjustment mechanism (180) is adjustable to vary the axial distance from the pressure plate to the pole face to take up and compensate friction disc wear and maintain the air gap within a given tolerance as the friction disc wears with use. A torque adjustment mechanism (250) is adjustable to vary the bias of the biasing members biasing the armature away from the pole face, to vary braking torque. A release mechanism (310) includes pivot-bases (316, 318) with radially inwardly extending tabs (320, 322) for engaging and pushing the armature toward the pole face and against the bias of the biasing members, for manual release of the brake.

45 Claims, 8 Drawing Sheets

U.S. PATENT DOCUMENTS

| | | | |
|---|---|---|---|
| 4,570,758 | 2/1986 | Hendricks . | |
| 4,828,077 | 5/1989 | Stevens, Jr. . | |
| 5,186,287 | 2/1993 | Lindner et al. | 188/216 |
| 5,259,486 | 11/1993 | Deane | 188/218 R |
| 5,421,436 | 6/1995 | Lindner et al. | 188/171 |
| 5,433,300 | 7/1995 | Barlow et al. | 188/218 X |
| 5,535,857 | 7/1996 | Barlow | 188/218 X |
| 5,620,065 | 4/1997 | Baker et al. | 188/171 |

FAST RESPONSE ADJUSTABLE BRAKE

BACKGROUND AND SUMMARY

The invention arose during development efforts relating to brakes, including direct acting spring-set electromagnetically released brakes for electric motors.

The above type brake includes a magnetically permeable body having a pole face, an armature axially movable toward and away from the pole face, an energization coil energizable to magnetically attract the armature toward the pole face, biasing means biasing the armature away from the pole face, a pressure plate mounted to the body and axially spaced from the pole face, and a friction disc between the armature and the pressure plate and keyable to an axially extending rotary shaft, such as an electric motor shaft. Upon deenergization of the coil, the biasing means biases the armature to a braking position pushing the friction disc against the pressure plate to stop rotation of the disc and shaft. The armature in the braking position defines an air gap between the pole face and the armature. Upon energization of the coil, the armature is pulled through the air gap toward the pole face to a released position releasing the disc and permitting rotation of the shaft.

The present invention provides performance improvements for faster brake response. A plurality of magnetically permeable segments are provided in a housing shell and are separated and spaced from each other around the shell to break up eddy currents which oppose build-up of the magnetic field, to afford faster brake response. In preferred form, the segments are inserted into a mold followed by direct casting of the shell in-situ around the segments to form a housing shell providing the brake body.

The present invention provides an air gap adjustment mechanism adjustable to vary the axial distance from the pressure plate to the pole face to take up and compensate friction disc wear and maintain the air gap within a given tolerance as the friction disc wears with use.

The present invention provides a torque adjustment mechanism adjustable to vary the bias of the biasing means biasing the armature away from the pole face. In preferred form, a torque plate cams a plurality of biasing springs, increasing or decreasing compression of the latter.

The present invention further provides a simple, effective and reliable release mechanism for manually releasing the brake.

DETAILED DESCRIPTION

Figure 1:
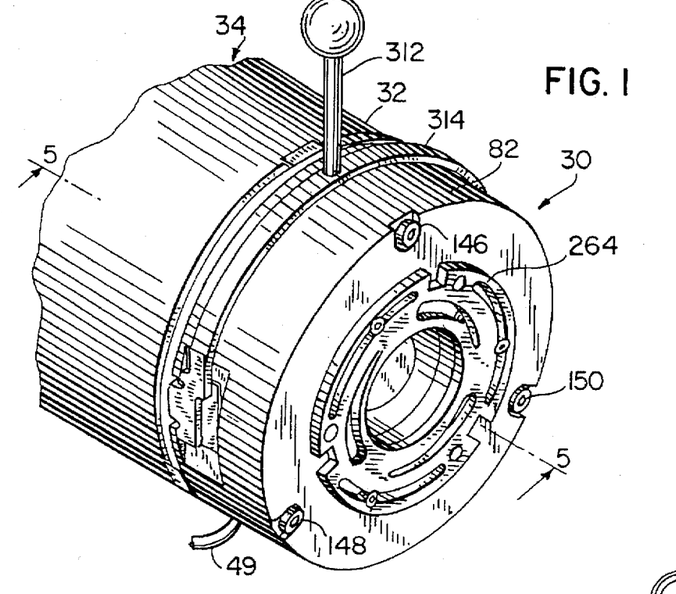
FIG. 1 is an isometric view of a brake in accordance with the invention mounted to an electric motor frame.
Figure 2:
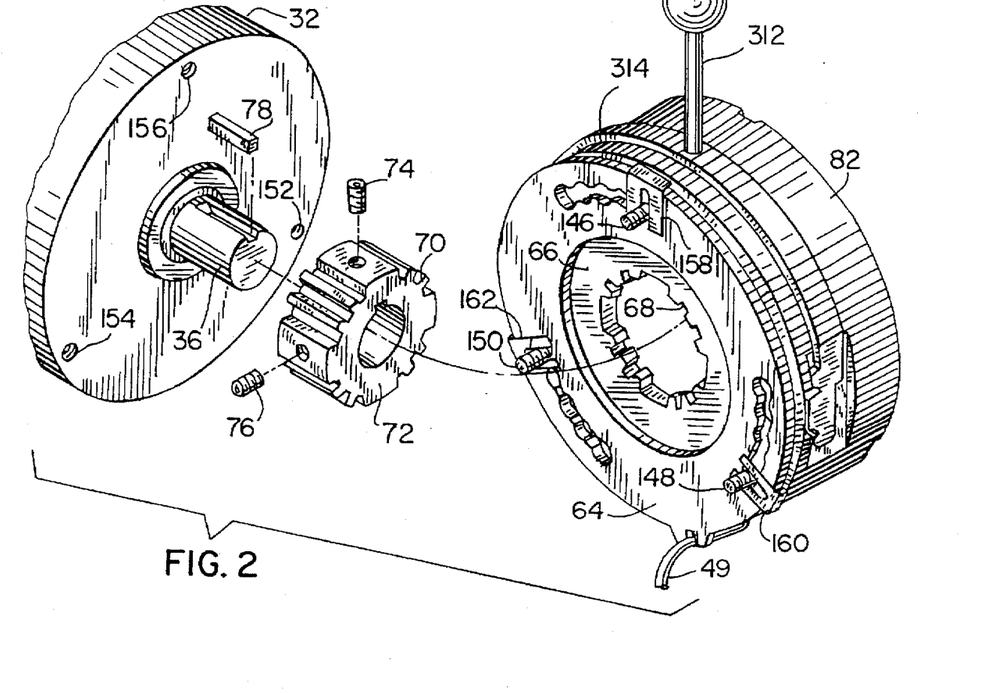
FIG. 2 is an isometric view of separated components of FIG. 1.

FIG. 1 shows a direct acting spring set electromagnetically released brake 30 mounted to the frame 32 of an electric motor 34 having a rotary shaft 36, FIG. 2, extending therefrom. The brake includes a magnetically permeable body 38, FIGS. 1–5, having a pole face 40. A magnetically permeable armature 42 is axially movable, i.e. right-left in FIG. 5, toward and away from pole face 40. An energization coil 44, provided by copper wire 46 wound on bobbin 48, is energizable at conductor lead 49 to magnetically attract armature 42 toward pole face 40 due to the magnetic flux field passing through body 38 and armature 42. Biasing means 50 provided by compression springs 52, 54, 56, 58, 60, 62, biases armature 42 away from pole face 40. Pressure plate 64 is mounted to the brake body and is axially spaced from pole face 40. Friction disc 66 is between armature 42 and pressure plate 64 and is keyable to axially extending rotary shaft 36. Friction disc 66 has an inner periphery 68, FIG. 2, of given toothed configuration mating with a like toothed outer configuration 70 of hub 72 mounted on shaft 36 by set screws 74 and 76 and keyed to rotate therewith by key 78. Upon deenergization of coil 44, biasing means 50 biases armature 42 to a braking position, leftwardly in FIG. 5, pushing friction disc 66 against pressure plate 64 to stop rotation of disc 66, hub 72 and shaft 36. Armature 42 in the noted braking position defines an air gap 80, FIG. 5, between pole face 40 and armature 42. Upon energization of coil 44, armature 42 is pulled rightwardly in FIG. 5 through air gap 80 to a released position releasing disc 66 and permitting rotation of hub 72 and shaft 36.

Figure 4:
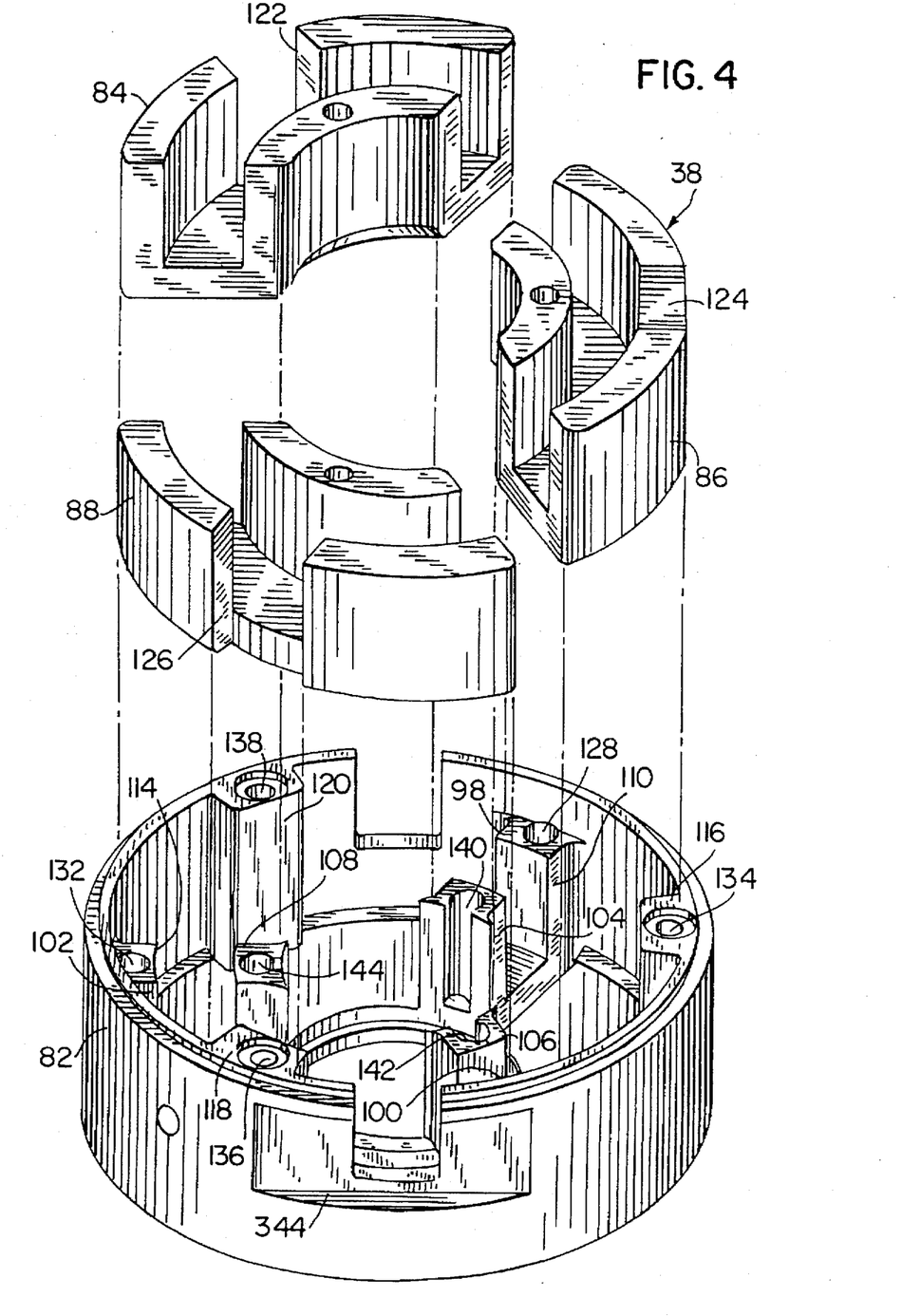
FIG. 4 is an exploded perspective view of a portion of the structure of FIG. 3.

Body 38 is formed by a housing shell 82, FIG. 4, having a plurality of magnetically permeable segments 84, 86, 88. The segments are separated and spaced from each other around the shell to break up eddy currents which oppose build-up of the magnetic field, to afford faster brake response. Eddy currents circulate in the structure and oppose the build-up of the magnetic flux field. Segmenting the magnetized members breaks up the circular current flow path otherwise creating a circular magnetic field which opposes the build-up of the magnetic flux, i.e. a continuous current path allows much larger eddy currents to be produced. Shell 82 is composed of material which is thermally conductive and dissipates brake heat and is of lower magnetic permeability than segments 84, 86, 88, to break up eddy currents. Shell 82 is composed of a lower melting point material than segments 84, 86, 88, such that the shell may be cast around the segments inserted into a mold. In preferred form, segments 84, 86, 88 are sintered steel, and shell 82 is cast-in-situ aluminum. The segments are wedge-shaped sintered steel portions insert-molded in an aluminum casting providing the shell.

Figure 7:
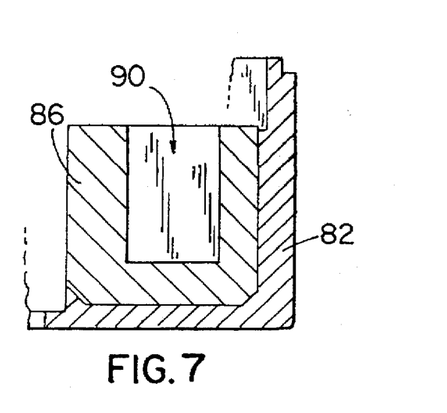
FIG. 7 is a view taken along line 7—7 of FIG. 6.
Figure 8:
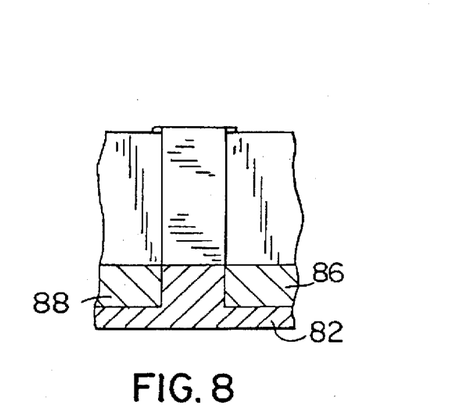
FIG. 8 is a view taken along line 8—8 of FIG. 6.

Segments 84, 86, 88 are arcuate and have a U-shape 90 in radial cross-section, FIG. 7. The brake body is an annulus having inner and outer circumferences 92 and 94, FIG. 3, and a U-shaped channel 96 therebetween in radial cross-section and aligned with the U-shape of arcuate segments 84, 86, 88, to provide a continuous U-shaped channel along the annulus. The brake body has a plurality of dividers 98, 100, 102 of U-shape in radial cross-section. The dividers have inner legs 104, 106, 108 on inner circumference 92, and outer legs 110, 112, 114 on outer circumference 94. The noted legs separate respective segments 84, 86, 88. Outer legs 110, 112, 114 provide a first set of axially extending posts. Shell 82 has a second set of axially extending posts 116, 118, 120 spaced around outer circumference 94 of the shell and interdigitated with the first set of posts 110, 112, 114. Segments 84, 86, 88 have respective outer slots 122, 124, 126 receiving a respective post 120, 116, 118. Inner legs 104, 106, 108 provide a third set of axially extending posts spaced around inner circumference 92 of shell 82. Each of the noted posts 110, 112, 114 of the first set, 116, 118, 120 of the second set, 104, 106, 108 of the third set, has an axially extending bore therein, shown respectively at 128, 130, 132, 134, 136, 138, 140, 142, 144. A first set of compression springs 58, 60, 62 of biasing means 50 extend axially in bores 128, 130, 132 of the noted first set of posts 110, 112, 114. A second set of compression springs 52, 54, 56 of the biasing means 50 extend axially in respective bores 140, 142, 144 of the noted third set of posts 104, 106, 108. A plurality of mounting bolts 146, 148, 150 extend through respective bores 134, 136, 138 of respective posts 116, 118, 120 of the noted second set for mounting the brake to electric motor frame 32 from which shaft 36 extends. Bolts 146, 148, 150 are threaded into respective threaded apertures 152, 154, 156 of motor frame 34, FIG. 2. Retainer clips 158, 160, 162 engage the threads of respective bolts 146, 148, 150 and engage the bottom side of pressure plate 64 and hold the brake in assembled condition until mounted to motor frame 32. A sealing O-ring gasket 164 is compressed between shell 82 and pressure plate 64. Armature 42 has outer peripheral slots 166, 168, 170 axially sliding along respective posts 120, 116, 118 and preventing rotation of the armature.

Figure 5:
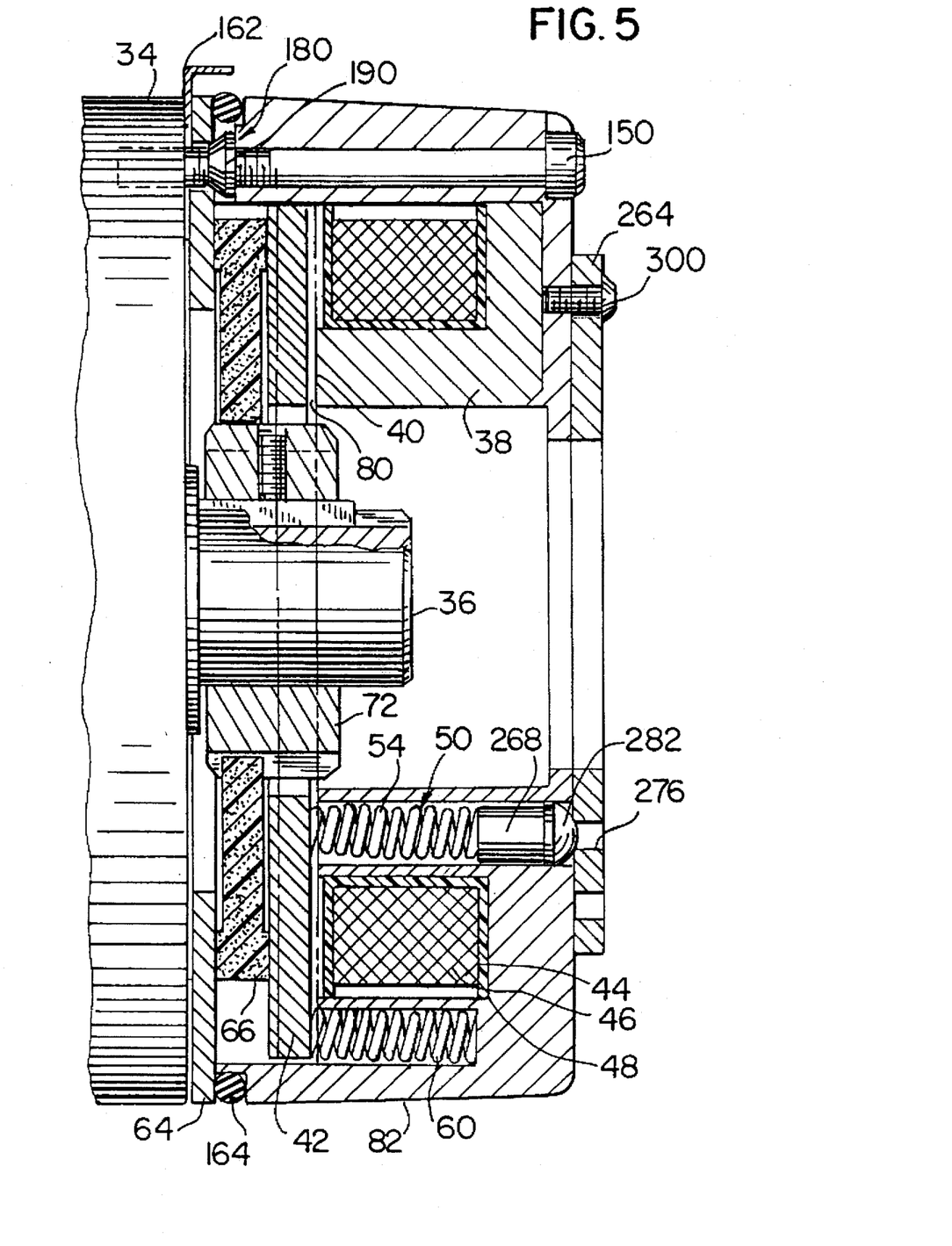
FIG. 5 is a side view partially in section of the brake of FIG. 1.
Figure 6:
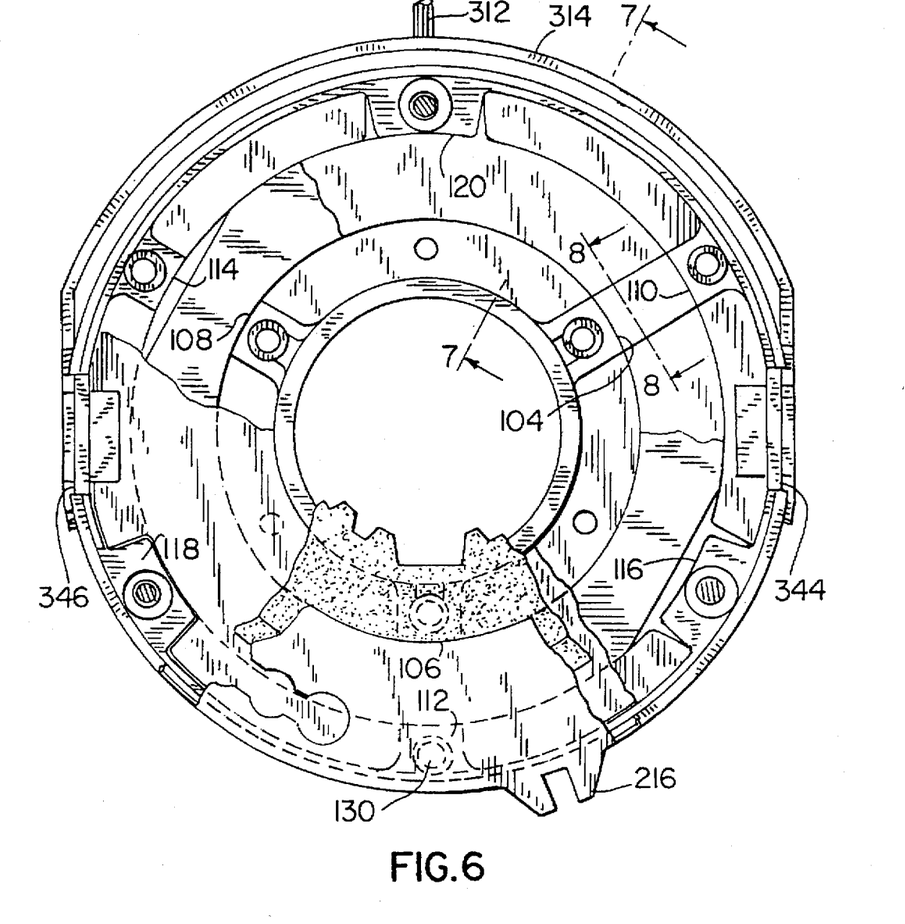
FIG. 6 is a bottom view partially in section of the brake of FIG. 1.

The brake includes an air gap adjustment mechanism 180, FIG. 5, adjustable to vary the axial distance from pressure plate 64 to pole face 40 to take up and compensate friction disc wear and maintain air gap 80 within a given tolerance as friction disc 66 wears with use. As friction disc 66 wears, its axial width such as 182, FIG. 10, decreases, for example to shorter dimension 184, FIG. 12. This in turn means that armature 42 moves further leftwardly in FIG. 5 to the braking position to engage friction disc 66, which in turn increases the axial width of air gap 80, FIG. 5. The greater the width of air gap 80, the greater magnetic force necessary to attract armature 42 through such gap toward pole face 40 and/or the slower the response time to release the brake upon energization of coil 44 and/or the greater the voltage necessary to apply across coil 44 to provide sufficient current to provide sufficient magnetic field to attract armature 42 rightwardly toward pole face 40. These changes in operation of the brake are not desirable as friction disc 66 wears. Instead, it is desired to maintain the width of air gap 80 within a given tolerance, to provide consistent fast brake response at consistent voltage requirements.

The noted axial distance between pressure plate 64 and pole face 40 is varied by partial rotation of pressure plate 64 along a given arc about the axis of shaft 36. Pressure plate 64 is rotatable to a plurality of positions along the noted arc to progressively shorten the axial distance from pressure plate 64 to pole face 40 to compensate friction disc wear and maintain air gap 80 within a given tolerance. A plurality of spacers 186, 188, 190, FIG. 3, space pressure plate 64 from the brake body and are responsive to partial rotation of pressure plate 64 along the noted arc to shorten the axial spacing of pressure plate 64 and the brake body. Spacers 186, 188, 190 are provided by frustoconical washers each surrounding a respective bolt 146, 148, 150 and having a respective first end face 192, 194, 196 engaging the brake body, and a second distally opposite frustoconical end face 198, 200, 202 engaging a respective seat in pressure plate 64.

Figure 3:
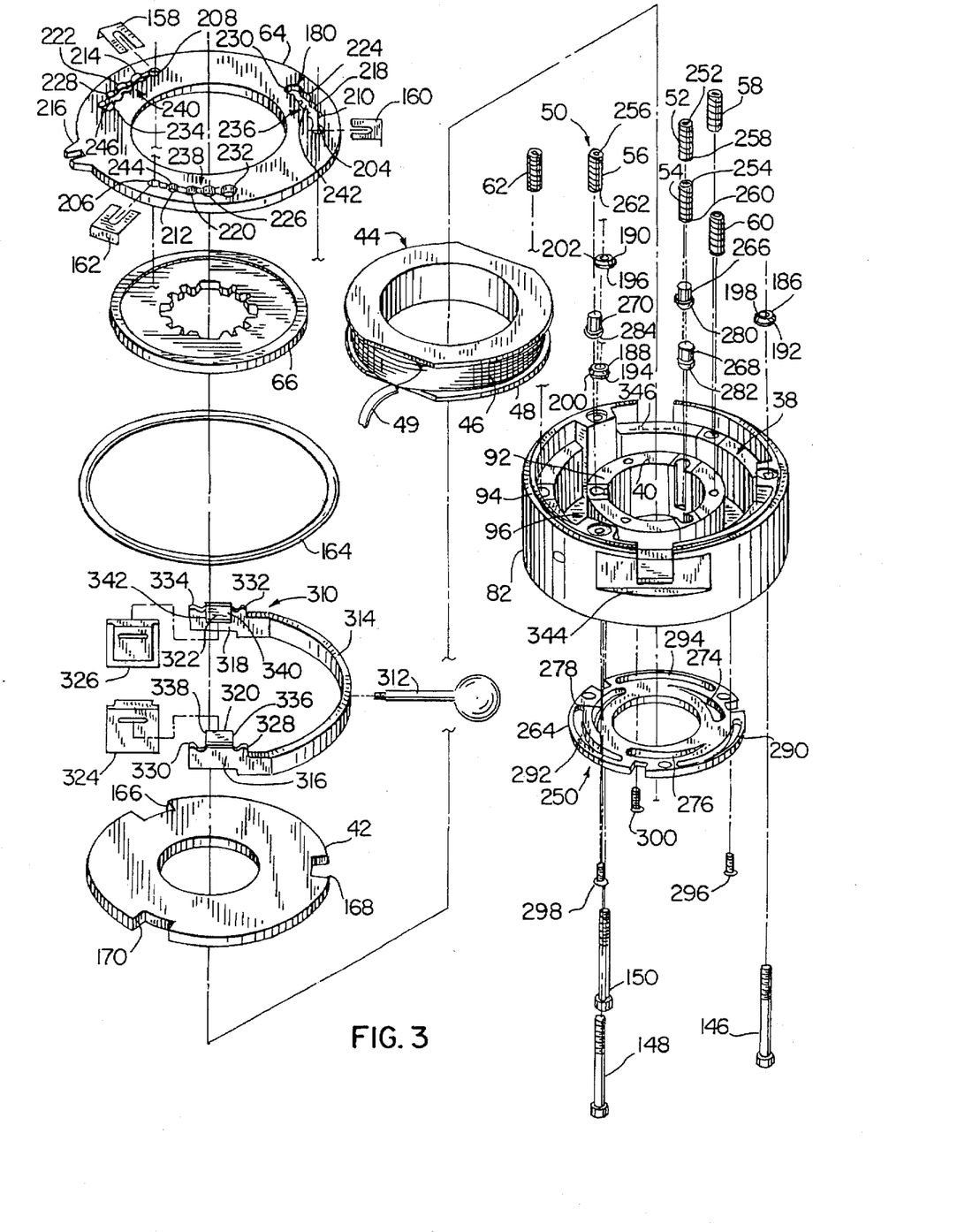
FIG. 3 is an exploded isometric view of the brake of FIG. 1.
Figures 9, 10, 11, 12:
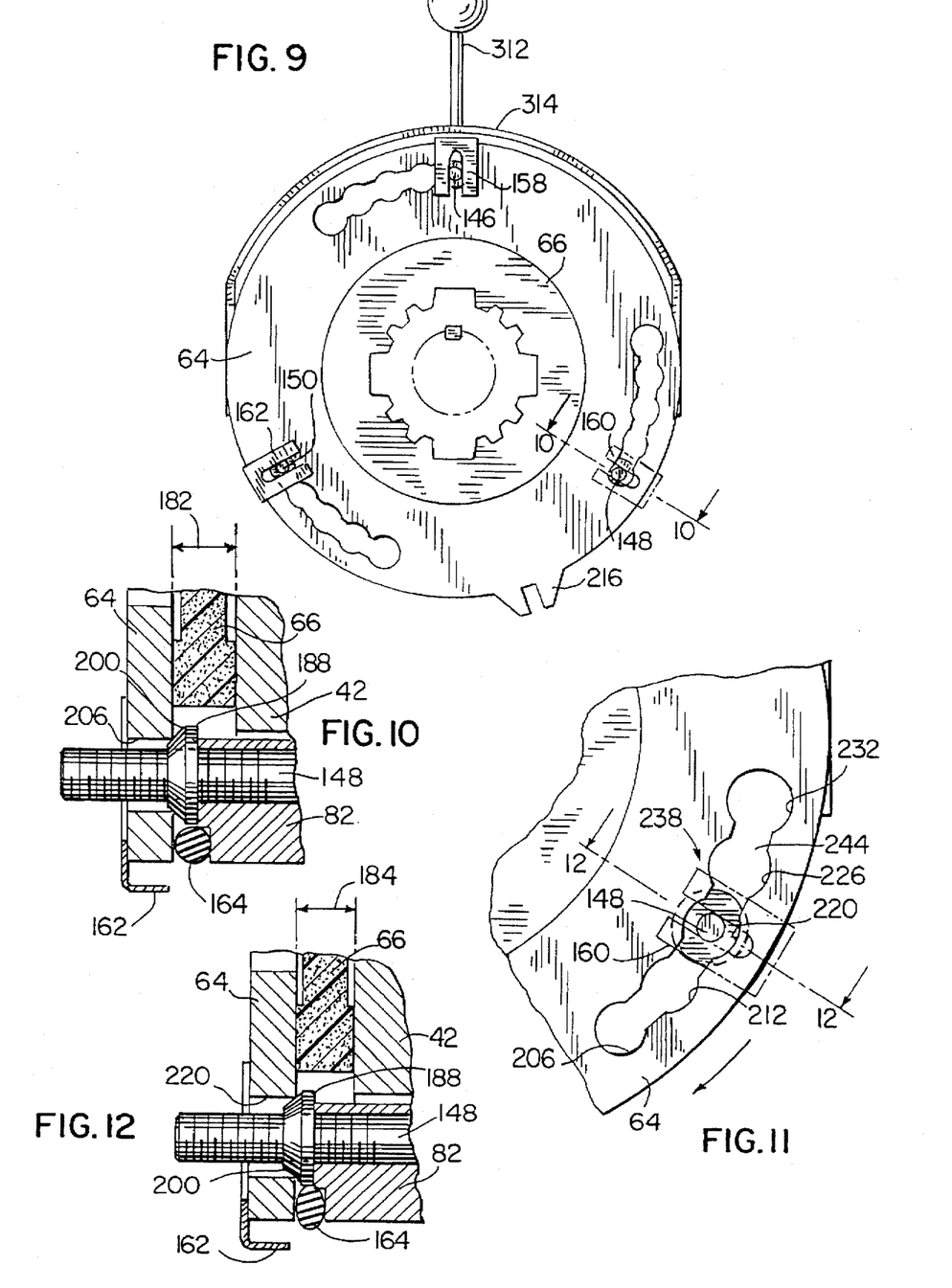
FIG. 9 is a bottom view of the brake of FIG. 1.
FIG. 10 is a view taken along line 10—10 of FIG. 9.
FIG. 11 is an enlarged view of a portion of the structure of FIG. 9 and shows an alternate position.
FIG. 12 is a view taken along line 12—12 of FIG. 11.

Pressure plate 64 has a first set of seats 204, 206, 208, FIG. 3, initially engaging and receiving respective frustoconical end faces 198, 200, 202 of respective spacer washers 186, 188, 190, and affording maximum spacing of pressure plate 64 from the brake body to afford initial friction disc width 182, FIG. 10. Pressure plate 64 has a second set of seats 210, 212, 214 engaging and receiving respective frustoconical end faces 198, 200, 202 of respective spacer washers 186, 188, 190 upon partial rotation of pressure plate 64 about the axis of shaft 36. This is accomplished by loosening bolts 146, 148, 150, and manually partially rotating pressure plate 64 by grasping tab 216 or otherwise grasping the outer periphery of the pressure plate. Seats 210, 212, 214 have a larger diameter than seats 204, 206, 208, such that the frustoconical spacer washers are received in seats 210, 212, 214 in deeper seating relation, to reduce the axial spacing of pressure plate 64 from the brake body, and compensate for wear of friction disc 66, to maintain air gap 80 within a given tolerance. Pressure plate 64 has a third set of seats 218, 220, 222 of larger diameter than seats 210, 212, 214 and spacing pressure plate 64 from the brake body by a third axial distance less than the axial distance spacing provided by the second set of seats 210, 212, 214. Pressure plate 64 has a fourth set of seats 224, 226, 228 of larger diameter than seats 218, 220, 222 and receiving the respective frustoconical spacer washers and spacing the pressure plate from the brake body by a fourth axial distance less than the noted third axial distance. Pressure plate 64 has a fifth set of seats 230, 232, 234 each of larger diameter than seats 224, 226, 228, and receiving respective spacer washers 186, 188, 190, and spacing the pressure plate from the brake body by a fifth axial distance less than the noted fourth axial distance. The plural sets of seats accommodate further friction disc wear with use, to provide closer and closer axial spacing of pressure plate 64 from the brake body to accommodate reduced axial width 184, FIG. 12, of the friction disc, and maintain air gap 80 within a given tolerance.

The noted seats in pressure plate 64 are arranged in first, second and third groups 236, 238, 240 separated and spaced from each other on a circular path concentric with the axis of motor shaft 36, each group having the noted plurality of seats and subtending an arc about such axis. The first seats 204, 206, 208 of respective groups 236, 238, 240 define the noted first set receiving respective frustoconical spacer washers 186, 188, 190 and spacing pressure plate 64 from the brake body by a first axial distance. The second seats 210, 212, 214 of groups 236, 238, 240 form a second set spacing pressure plate 64 from the brake body by a second axial distance less than the noted first axial distance. The third seats 218, 220, 222 of groups 236, 238, 240 form a third set and space pressure plate 64 from the brake body by a third axial distance less than the noted second axial distance. The fourth seats 224, 226, 228 of groups 236, 238, 240 form a fourth set and space pressure plate 64 from the brake body by a fourth axial distance less than the noted third axial distance. The fifth seats 230, 232, 234 of the groups 236, 238, 240 form a fifth set and space pressure plate 64 from the brake body by a fifth axial distance less than the noted fourth axial distance. Pressure plate 64 is partially rotatable about the noted axis to disengage frustoconical end faces 198, 200, 202 of spacer washers 186, 188, 190 from the first set of seats 204, 206, 208 and engage such frustoconical end faces of the spacer washers with the second set of seats 210, 212, 214 to take up and compensate friction disc wear and maintain air gap 80 within a given tolerance. After further wear of the friction disc, pressure plate 64 is further rotated to disengage the spacer washers from the second set of seats 210, 212, 214, and engage the spacer washers with the third set of seats 218, 220, 222. As friction disc 66 continues to wear, pressure plate 64 is further rotated to engage the fourth set of seats 224, 226, 228 with the spacer washers, and then after further wear the pressure plate 64 is further rotated to engage the fifth set of seats 230, 232, 234 with the spacer washers. The sets of seats in each group have increasing diameters receiving the frustoconical spacer washers in deeper seating relation upon rotation of pressure plate 64 to engage the spacer washers with different sets of seats, to adjust air gap 80 and compensate for friction disc wear.

Pressure plate 64 is partially rotatable along a given arc subtended by each group 236, 238, 240. The seats of each group 236, 238, 240 are joined by a respective arcuate slot 242, 244, 246 each defining the given arc. Mounting bolts 146, 148, 150 extending axially through the brake body for mounting the brake to motor frame 32, as above described. Each bolt 146, 148, 150 extends through a respective arcuate slot 242, 244, 246 such that upon partial rotation of pressure plate 64 along the given arc, each arcuate slot slides along a respective bolt. The range of partial rotation of pressure plate 64 is limited by the arcuate length of the slots.

The above described air gap adjustment mechanism and method adjustably varies the axial distance from pressure plate 64 to pole face 40 by partially rotating pressure plate 64 about the axis of shaft 36, to take up and compensate friction disc wear and maintain air gap 80 within a given tolerance as friction disc 66 wears with use. The above described plurality of sets of seats in the pressure plate receive the spacer washers at different seated depths. Pressure plate 64 is partially rotated along a given arc about the noted axis to seat the spacer washers in different seats, to shorten the axial spacing of the pressure plate and brake body with deeper seatings of the spacer washers, to adjust air gap 80 and compensate for friction disc wear. The air gap is adjusted by loosening bolts 146, 148, 150, partially rotating pressure plate 64 about the noted axis to seat spacer washers 186, 188, 190 in different depth seats in pressure plate 64, and then retightening bolts 146, 148, 150.

A torque adjustment mechanism 250, FIG. 3, is provided and is adjustable to vary the bias of biasing springs 52, 54, 56 biasing armature 42 away from pole face 40. Biasing springs 52, 54, 56 extend axially through the brake body and have first ends 252, 254, 256 bearing against armature 42, and have distally opposite second ends 258, 260, 262. The torque adjustment mechanism includes a partially rotatable torque plate 264 and a plurality of spring plugs 266, 268, 270 engaging respective ends 258, 260, 262 of respective springs 52, 54, 56. Torque plate 264 is mounted on the brake body and is partially rotatable about the axis of shaft 36 to vary the compression of biasing springs 52, 54, 56.

Torque plate 264 has a plurality of arcuate slots 274, 276, 278 of tapered radial width each partially receiving a respective spring plug 266, 268, 270 at a respective rounded end 280, 282, 284. Torque plate 264 is partially rotatable in a counterclockwise direction in FIG. 13 to engage a respective spring plug 266, 268, 270 at a respective rounded end 280, 282, 284 with a respective slot 274, 276, 278 along a narrowing taper to push the respective spring plug 266, 268, 270 axially toward armature 42, which is leftwardly in FIG. 14, to increase the compression of the respective biasing spring 52, 54, 56, to increase braking torque. Torque plate 264 is partially rotatable in the opposite direction, clockwise in FIG. 15, such that each spring plug 266, 268, 270 at its respective rounded head end 280, 282, 284 engages its respective slot 274, 276, 278 along a widening taper to permit movement of the respective spring plug 266, 268, 270 axially away from armature 42, rightwardly in FIG. 16, to decrease the compression of the respective biasing spring 52, 54, 56, to reduce braking torque.

Figures 13, 14, 15, 16:
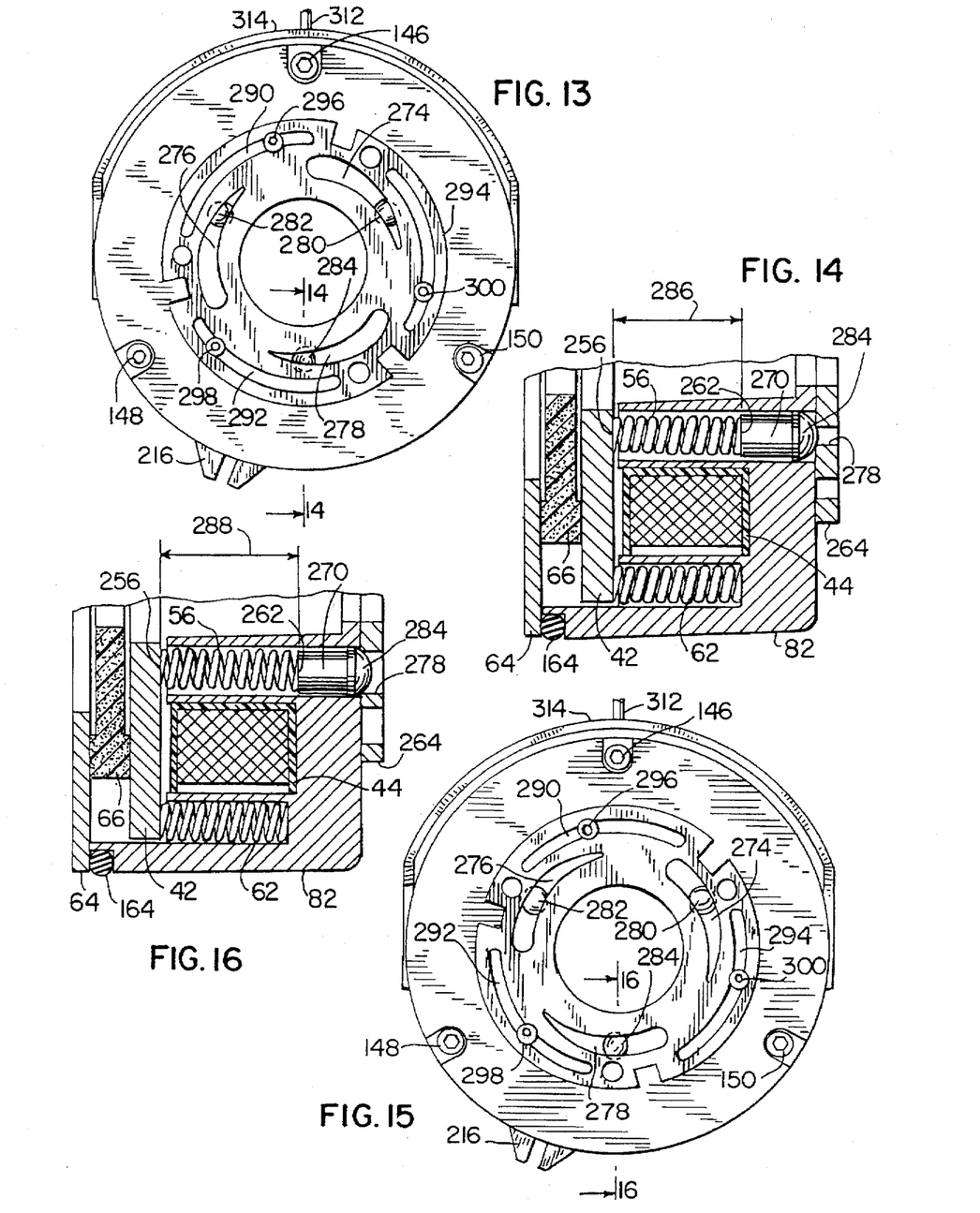
FIG. 13 is a top view of the brake of FIG. 1.
FIG. 14 is a view taken along line 14—14 of FIG. 13.
FIG. 15 is a view like FIG. 13 and shows another position.
FIG. 16 is a view taken along line 16—16 of FIG. 15.

As seen in FIGS. 13–16, biasing spring 56, FIG. 14, is compressed to axial compression length 286 when rounded end 284 of spring plug 270 is in a narrow portion of tapered slot 278. Compression spring 56 is compressed to axial compression length 288, FIG. 16, when rounded end 284 of spring plug 270 is in a wider portion of tapered slot 278. Axial distance 286 is less than axial distance 288, whereby the rotated position of torque plate 264 in FIG. 13 provides greater axial compression of biasing springs 52, 54, 56 and hence greater braking torque than the rotated position of torque plate 264 in FIG. 15. Torque plate 264 has a set of arcuate slots 290, 292, 294 of constant radial width receiving respective bolts 296, 298, 300 extending therethrough and mounting torque plate 264 to brake body shell 82 and permitting partial rotation of torque plate 264 about the axis of shaft 36. The range of partial rotation of torque plate 264 is limited by the arcuate length of each of slots 290, 292, 294.

The combination of torque plate 264 and rounded end spring plugs 280, 282, 284 provides a torque adjusting camming mechanism engaging biasing springs 52, 54, 56 and camming the latter to vary the axial bias thereof, e.g. between different axial compression lengths 286 and 288. The apparatus and method thus adjustably varies the bias of the biasing springs biasing armature 42 away from pole face 40 to vary the bias of armature 42 in the braking position, to adjust braking torque.

Figure 17:
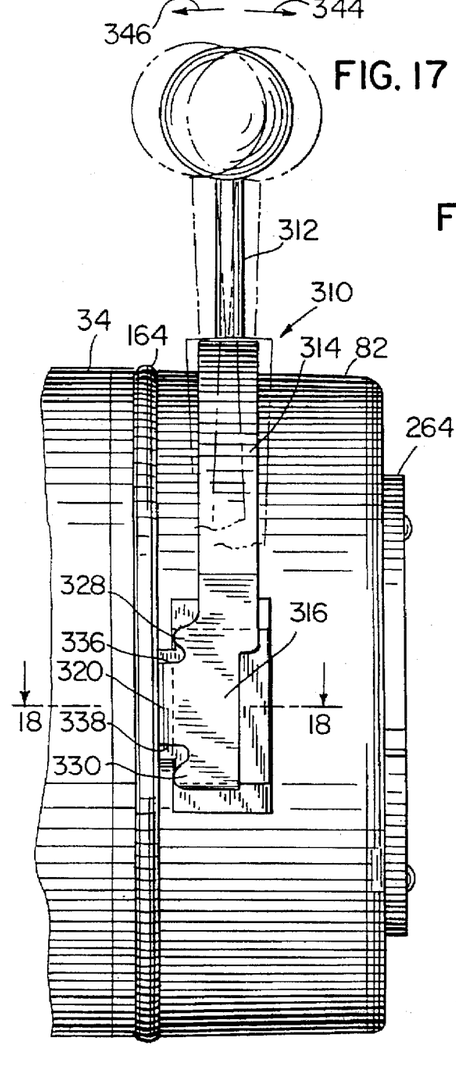
FIG. 17 is a side view of the brake of FIG. 1.
Figure 18:
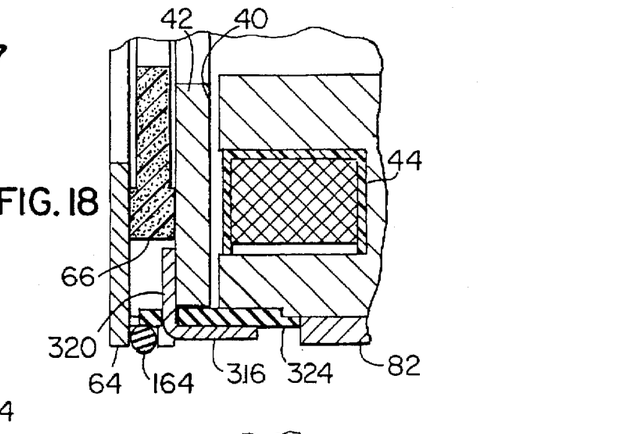
FIG. 18 is a view taken along line 18—18 of FIG. 17.

The brake includes a release mechanism 310, FIGS. 3 and 17. The release mechanism includes a manually engageable handle 312 connected to a yoke 314 having pivot-bases 316 and 318, FIG. 3, mounted to the brake body on opposite distal sides of the axis of rotation of shaft 36. Pivot-bases 316, 318 have respective tabs 320, 322 extending through respective retention spacer clips 324, 326 and radially inwardly between pressure plate 64 and armature 42. Each tab 318, 320 is spaced radially outwardly of friction disc 66. Pivot-bases 316, 318 are pivotable about an axis perpendicular to the axis of shaft 36 such that tabs 316, 318 engage and push armature 42 toward pole face 40 and against the bias of biasing springs 52, 54, 56, 58, 60, 62. This releases the brake and allows rotation of friction disc 66, hub 72 and shaft 36.

Pivot-base 316 has pivot bosses 328, 330 on opposite sides of tab 320. Pivot-base 318 has pivot bosses 332, 334 on opposite sides of tab 322. Tab 320 has an inner edge 336 facing pivot boss 328 and then extending radially inwardly. Tab 320 has an inner edge 338 facing pivot boss 330 and then extending radially inwardly. Tab 322 has an inner edge 340 facing pivot boss 332 and then extending radially inwardly. Tab 322 has an inner edge 342 facing pivot boss 334 and then extending radially inwardly.

Figure 19:
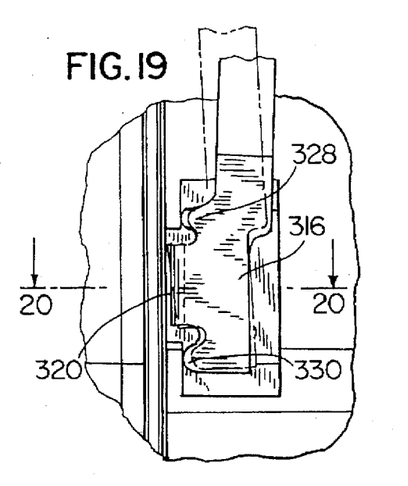
FIG. 19 is a view of a portion of the structure of FIG. 17.
Figure 20:
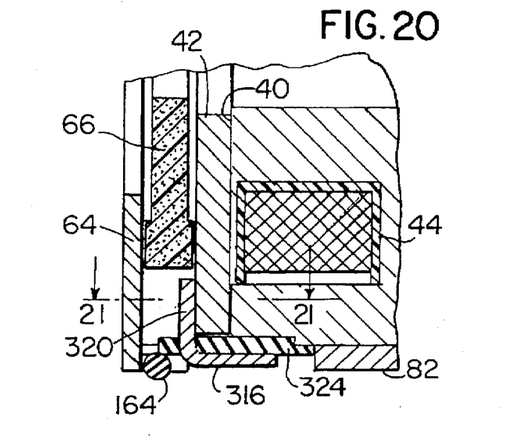
FIG. 20 is a view taken along line 20—20 of FIG. 19.
Figure 21:
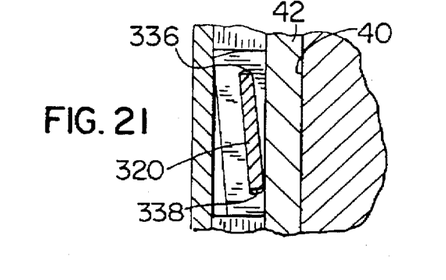
FIG. 21 is a view taken along line 21—21- of FIG. 20.

Upon rightward axial movement of handle 312 in FIG. 17 as shown at arrow 344, inner edges 336, 340 of tabs 320, 322 engage armature 42 as pivot-bases 316, 318 are pivoted about pivot bosses 330, 334, as shown in solid line in FIG. 19. When handle 312 is moved axially leftwardly in FIG. 17 as shown at arrow 346, inner edges 338, 342 of tabs 320, 322 engage armature 42 as pivot-bases 316, 318 pivot about pivot bosses 328, 332, as shown in dashed line in FIG. 19. Brake body shell 82 has distally opposite outer ledges 344, 346 cast on its outer periphery on opposite distal sides of the axis of rotation of shaft 36. Pivot bosses 328, 330 and 332, 334 pivot on respective ledges 344 and 346. When pivot-bases 316, 318 pivot about pivot bosses 330, 334, pivot bosses 328, 332 disengage ledges 344, 346 of the brake body, and inner edges 338, 342 disengage armature 42. When pivot-bases 316, 318 pivot about pivot bosses 328, 332, pivot bosses 330, 334 disengage respective ledges 344, 346, and inner edges 336, 340 disengage armature 42, FIG. 21. Handle 312 can thus be moved in either direction 344 or 346 to manually release the brake.

It is recognized that various equivalents, alternatives and modifications are possible within the scope of the appended claims.

We claim:

1. A brake comprising:

a magnetically permeable body having a pole face;

an armature axially movable toward and away from said pole face;

an energization coil energizable to magnetically attract said armature toward said pole face;

biasing means biasing said armature away from said pole face;

a pressure plate mounted to said body and axially spaced from said pole face;

a friction disc between said armature and said pressure plate and keyable to an axially extending rotary shaft, such that upon deenergization of said coil, said biasing means biases said armature to a braking position pushing said friction disc against said pressure plate to stop rotation of said disc and said shaft, said armature in said braking position defining an air gap between said pole face and said armature, and such that upon energization of said coil, said armature is pulled through said gap toward said pole face to a released position releasing said disc and permitting rotation of said shaft;

said body comprising a housing shell having a plurality of magnetically permeable segments.

2. The brake according to claim 1 wherein said segments are separated and spaced from each other around said shell to break up eddy currents which oppose build-up of the magnetic field, to afford faster brake response.

3. The brake according to claim 2 wherein said shell is composed of material which is thermally conductive and dissipates brake heat and is of lower magnetic permeability than said segments, to break up said eddy currents.

4. The brake according to claim 1 wherein said shell is composed of a lower melting point material than said segments, such that said shell may be cast around said segments inserted into a mold.

5. The brake according to claim 1 wherein said segments are steel, and said shell is cast-in-situ aluminum, said segments being separated and spaced from each other around said shell to break up eddy currents which oppose build-up of the magnetic field, to afford faster brake response, said aluminum shell being thermally conductive and dissipating brake heat and having less magnetic permeability than said steel segments, to break up said eddy currents, said aluminum shell having a lower melting point than said steel segments, such that said aluminum shell may be cast around said steel segments inserted into a mold.

6. The brake according to claim 1 wherein said segments comprise a plurality of wedge-shaped sintered steel portions insert-molded in an aluminum casting providing said shell.

7. The brake according to claim 1 wherein said segments comprise a plurality of arcuate segments each having a U-shape in radial cross-section.

8. The brake according to claim 7 wherein said body is an annulus having inner and outer circumferences and a U-shaped channel therebetween in radial cross-section and aligned with said U-shape of said arcuate segments to provide a continuous U-shaped channel along said annulus.

9. The brake according to claim 8 wherein said body has a plurality of dividers of U-shape in radial cross-section, each divider having an inner leg on said inner circumference and an outer leg on said outer circumference and separating respective said segments.

10. The brake according to claim 9 wherein said shell has a first set of axially extending posts provided by said outer legs spaced around said outer circumference, and a second set of axially extending posts spaced around said outer circumference and interdigitated with said first set of posts, said segments are separated from each other by said first set of posts, said segments have respective outer slots each receiving a respective post of said second set.

11. The brake according to claim 10 wherein said shell has a third set of axially extending posts provided by said inner legs spaced around said inner circumference, each of said posts of said first, second and third sets having an axially extending bore therein, and wherein said biasing means comprises a plurality of axially extending compression springs including a first set of springs in said bores of said first set of posts, and a second set of springs in said bores of said third set of posts, and comprising a plurality of mounting bolts each extending through a respective bore of a respective post of said second set for mounting said brake to a frame from which said shaft extends.

12. The brake according to claim 11 wherein said springs in said bores of said third set of posts have spring plugs at their ends opposite said armature, and comprising a torque adjustment plate on said body and rotatable to cam said spring plugs toward said armature to compress the respective said springs and increase the compression bias thereof pushing said armature against said friction disc and said pressure plate in said braking position.

13. A method for making a brake having a magnetically permeable body having a pole face, an armature axially movable toward and away from said pole face, an energization coil energizable to magnetically attract said armature toward said pole face, biasing means biasing said armature away from said pole face, a pressure plate mounted to said body and axially spaced from said pole face, a friction disc between said armature and said pressure plate and keyable to an axially extending rotary shaft, such that upon deenergization of said coil, said biasing means biases said armature to a braking position pushing said friction disc against said pressure plate to stop rotation of said disc and said shaft, said armature in said braking position defining an air gap between said pole face and said armature, and such that upon energization of said coil, said armature is pulled through said gap toward said pole face to a released position releasing said disc and permitting rotation of said shaft, said method comprising:

providing a plurality of magnetically permeable segments;

inserting said segments into a mold;

casting a shell in said mold around said segments to form a housing shell providing said body.

14. The method according to claim 13 comprising providing said segments of higher melting point material than said shell, to enable casting of said shell in-situ without melting said segments.

15. The method according to claim 14 comprising providing said segments of higher magnetic permeability material than said shell and separating and spacing said segments from each other around said shell to break up eddy currents which oppose build-up of the magnetic field, to afford faster brake response.

16. The method according to claim 15 comprising providing said shell of thermally conductive material to dissipate brake heat.

17. The method according to claim 16 wherein said shell is aluminum and said segments are steel.

18. A brake comprising:
a magnetically permeable body having a pole face;
an armature axially movable toward and away from said pole face;
an energization coil energizable to magnetically attract said armature toward said pole face;
biasing means biasing said armature away from said pole face;
a pressure plate mounted to said body and axially spaced from said pole face;
a friction disc between said armature and said pressure plate and keyable to an axially extending rotary shaft, such that upon deenergization of said coil, said biasing means biases said armature to a braking position pushing said friction disc against said pressure plate to stop rotation of said disc and said shaft, said armature in said braking position defining an air gap between said pole face and said armature, and such that upon energization of said coil, said armature is pulled through said gap toward said pole face to a released position releasing said disc and permitting rotation of said shaft;
an adjustment mechanism adjustable to vary the axial distance from said pressure plate to said pole face to take up and compensate friction disc wear and maintain said air gap within a given tolerance as said friction disc wears with use.

19. The brake according to claim 18 wherein said axial distance is varied by partial rotation of said pressure plate along a given arc about the axis of said shaft.

20. The brake according to claim 19 wherein said pressure plate is rotatable to a plurality of positions along said arc to progressively shorten the axial distance from said pressure plate to said pole face to compensate friction disc wear and maintain said air gap within said given tolerance.

21. The brake according to claim 19 comprising spacers spacing said pressure plate from said body and responsive to said partial rotation of said pressure plate along said arc to shorten the axial spacing of said pressure plate and said body, and a plurality of sets of seats in said pressure plate receiving said spacers, including a first set of seats receiving said spacers and spacing said pressure plate from said body by a first axial distance, and a second set of seats receiving said spacers and spacing said pressure plate from said body by a second axial distance less than said first axial distance.

22. The brake according to claim 19 comprising a plurality of groups of seats in said pressure plate receiving respective said spacers, said groups being separated and spaced from each other on a circular path concentric with said axis of said shaft, each group having a plurality of seats and subtending an arc about said axis, the first seats of said groups defining a first set receiving said spacers and spacing said pressure plate from said body by a first axial distance, the second seats of said groups forming a second set and spacing said pressure plate from said body by a second axial distance less than said first axial distance, said pressure plate being rotatable about said axis to disengage said spacers from said first set of seats and engage said spacers with said second set of seats to shorten the axial spacing of said pressure plate and said body from said first axial distance to said second axial distance to take up and compensate friction disc wear and maintain said air gap within said given tolerance.

23. The brake according to claim 18 comprising a plurality of frustoconical spacers between said pressure plate and said body, and a plurality of sets of seats in said pressure plate, said sets of seats having increasing diameters receiving said frustoconical spacers in deeper seating relation upon rotation of said pressure plate about the axis of said shaft to engage said spacers with different sets of said seats, to adjust said air gap and compensate for friction disc wear.

24. The brake according to claim 18 wherein said adjustment mechanism is partially rotatable along a given arc about the axis of said shaft to vary said air gap.

25. The brake according to claim 24 wherein said adjustment mechanism comprises a plurality of sets of seats of increasing diameter in said pressure plate receiving spacers between said pressure plate and said body in deeper seated relation upon rotation of said pressure plate about said axis.

26. The brake according to claim 25 wherein each set of seats comprises a plurality of seats of increasing diameter joined by an arcuate slot defining said given arc.

27. The brake according to claim 26 comprising a plurality of mounting bolts extending axially through said body for mounting said brake to a frame from which said shaft extends, each bolt extending through a respective said arcuate slot such that upon partial rotation of said pressure plate along said given arc, said arcuate slot slides along said bolt, the range of partial rotation of said pressure plate being limited by the arcuate length of said slot.

28. The brake according to claim 27 wherein said spacers comprise a plurality of frustoconical washers each surrounding a respective said bolt, each washer having a first end face engaging said body, and a second distally opposite frustoconical end face engaging a respective said seat along said arcuate slot, the larger the diameter seat the deeper the nesting of said frustoconical washer therein and the closer the axial spacing of said pressure plate and said body to take up and compensate friction disc wear and maintain said air gap within said given tolerance.

29. A brake adjustment method for a brake having a magnetically permeable body having a pole face, an armature axially movable toward and away from said pole face, an energization coil energizable to magnetically attract said armature toward said pole face, biasing means biasing said armature away from said pole face, a pressure plate mounted to said body and axially spaced from said pole face, a friction disc between said armature and said pressure plate and keyable to an axially extending rotary shaft, such that upon deenergization of said coil, said biasing means biases said armature to a braking position pushing said friction disc against said pressure plate to stop rotation of said disc and said shaft, said armature in said braking position defining an air gap between said pole face and said armature, and such that upon energization of said coil, said armature is pulled through said gap toward said pole face to a released position releasing said disc and permitting rotation of said shaft, said method comprising adjustably varying the axial distance from said pressure plate to said pole face by rotating said pressure plate about the axis of said shaft, to take up and compensate friction disc wear and maintain said air gap within a given tolerance as said friction disc wears with use.

30. The method according to claim 29 comprising providing a plurality of spacers between said body and said pressure plate, providing a plurality of sets of seats in said pressure plate receiving said spacers at different seated depths, and partially rotating said pressure plate along a given arc about said axis to seat said spacers in different seats, to shorten the axial spacing of said pressure plate and said body with deeper seatings of said spacers, to adjust said air gap and compensate for friction disc wear.

31. The method according to claim 30 comprising mounting said body with a plurality of bolts to a frame from which said shaft extends, said bolts extending through said spacers, and comprising adjusting said air gap by loosening said bolts, partially rotating said pressure plate about said axis to seat said spacers in different depth seats in said pressure plate, and retightening said bolts.

32. The method according to claim 30 comprising providing said sets of seats in a plurality of groups spaced from each other on a circular path concentric with said axis of said shaft, each group subtending said given arc about said axis, each group having one seat of each said set, each seat in each group being connected by a slot through which a respective said bolt extends.

33. A brake comprising:
a magnetically permeable body having a pole face;
an armature axially movable toward and away from said pole face;
an energization coil energizable to magnetically attract said armature toward said pole face;
biasing means biasing said armature away from said pole face;
a pressure plate mounted to said body and axially spaced from said pole face;
a friction disc between said armature and said pressure plate and keyable to an axially extending rotary shaft, such that upon deenergization of said coil, said biasing means biases said armature to a braking position pushing said friction disc against said pressure plate to stop rotation of said disc and said shaft, said armature in said braking position defining an air gap between said pole face and said armature, and such that upon energization of said coil, said armature is pulled through said gap toward said pole face to a released position releasing said disc and permitting rotation of said shaft;
a torque adjustment mechanism adjustable to vary the bias of said biasing means biasing said armature away from said pole face.

34. The brake according to claim 33 wherein said biasing means comprises a plurality of biasing springs extending axially through said body and having a first end engaging and bearing against said armature, and having a distally opposite second end, and wherein said torque adjustment mechanism engages said second end of said biasing springs.

35. The brake according to claim 34 wherein said torque adjustment mechanism comprises a torque plate mounted on said body and partially rotatable to vary the compression of said biasing springs.

36. The brake according to claim 35 comprising a plurality of spring plugs each engaging a respective said second end of a respective said biasing spring, and wherein said torque plate has a plurality of arcuate slots of tapered radial width each partially receiving a respective said spring plug, said torque plate being partially rotatable in a first direction to engage a respective spring plug with a respective slot along a narrowing taper to push said spring plug axially toward said armature to increase the compression of the respective said biasing spring, said torque plate being partially rotatable in the opposite direction such that each spring plug engages its respective slot along a widening taper to permit movement of the respective said spring plug axially away from said armature to decrease the compression of the respective said biasing spring.

37. The brake according to claim 36 comprising a second set of arcuate slots of constant radial width receiving bolts mounting said torque plate to said body and permitting partial rotation of said torque plate about said axis, the range of partial rotation of said torque plate being limited by the arcuate length of said slots.

38. The brake according to claim 33 wherein said torque adjustment mechanism comprises camming means engaging said biasing means and camming the latter to vary the axial bias thereof.

39. The brake according to claim 38 wherein said biasing means comprises a plurality of biasing compression springs axially biasing said armature away from said pole face, said torque adjustment mechanism comprises a torque plate with camming means engaging said biasing springs and camming said biasing springs axially upon partial rotation of said torque plate along a given arc about the axis of said shaft.

40. A method for adjusting braking torque in a brake having a magnetically permeable body having a pole face, an armature axially movable toward and away from said pole face, an energization coil energizable to magnetically attract said armature toward said pole face, biasing means biasing said armature away from said pole face, a pressure plate mounted to said body and axially spaced from said pole face, a friction disc between said armature and said pressure plate and keyable to an axially extending rotary shaft, such that upon deenergization of said coil, said biasing means biases said armature to a braking position pushing said friction disc against said pressure plate to stop rotation of said disc and said shaft, said armature in said braking position defining an air gap between said pole face and said armature, and such that upon energization of said coil, said armature is pulled through said gap toward said pole face to a released position releasing said disc and permitting rotation of said shaft, said method comprising adjustably varying the bias of said biasing means biasing said armature away from said pole face to vary the bias of said armature in said braking position to adjust braking torque.

41. The method according to claim 40 wherein said biasing means comprises a plurality of biasing compression springs, and comprising providing a torque plate and partially rotating said torque plate to vary the compression of said biasing springs.

42. The method according to claim 41 comprising providing said torque plate with camming means engaging said biasing springs, and camming said biasing springs axially by partially rotating said torque plate along a given arc about the axis of said shaft.

43. A brake comprising:
a magnetically permeable body having a pole face;
an armature axially movable toward and away from said pole face;
an energization coil energizable to magnetically attract said armature toward said pole face;
biasing means biasing said armature away from said pole face;

a pressure plate mounted to said body and axially spaced from said pole face;

a friction disc between said armature and said pressure plate and keyable to an axially extending rotary shaft, such that upon deenergization of said coil, said biasing means biases said armature to a braking position pushing said friction disc against said pressure plate to stop rotation of said disc and said shaft, said armature in said braking position defining an air gap between said pole face and said armature, and such that upon energization of said coil, said armature is pulled through said gap toward said pole face to a released position releasing said disc and permitting rotation of said shaft;

a release mechanism comprising first and second pivot-bases mounted to said body on opposite distal sides of the axis of rotation of said shaft, each pivot-base having a tab extending radially inwardly between said pressure plate and said armature, each tab being spaced radially outwardly of said friction disc, said pivot-bases being pivotable about an axis perpendicular to said axis of said shaft, and a handle yoke connected to said pivot-bases for pivoting the latter about said pivot axis such that said tabs engage and push said armature toward said pole face and against the bias of said biasing means.

44. The brake according to claim 43 wherein said first pivot-base has first and second pivot bosses on opposite sides of its respective said tab, said second pivot-base has first and second pivot bosses on opposite sides of its respective said tab, said tab of said first pivot-base has a first inner edge facing said first pivot boss and then extending radially inwardly, said tab of said first pivot-base has a second inner edge facing said second pivot boss and then extending radially inwardly, said tab of said second pivot-base has a first inner edge facing said first pivot boss and then extending radially inwardly, said tab of said second pivot-base has a second inner edge facing said second pivot boss and then extending radially inwardly, wherein said first inner edges of said tabs engage said armature when said pivot-bases are pivoted about said second pivot bosses in response to movement of said handle yoke in a first direction, and said second inner edges of said tabs engage said armature upon pivoting of said pivot-bases about said first pivot bosses in response to movement of said handle yoke in a second direction, wherein said first pivot bosses disengage said body and said second inner edges of said tabs disengage said armature upon pivoting of said pivot-bases about said second pivot bosses, and wherein said second pivot bosses disengage said body and said first inner edges of said tabs disengage said armature upon pivoting of said pivot-bases about said first pivot bosses.

45. The brake according to claim 44 comprising first and second distally opposite outer ledges cast on the outer periphery of said body on opposite distal sides of said axis of rotation of said shaft, wherein said first and second pivot bosses of said first pivot-base pivot on said first ledge, and said first and second pivot bosses of said second pivot-base pivot on said second ledge.

* * * * *